March 30, 1937.  P. HORINSTEIN  2,075,613
DISPLAY ADVERTISING DEVICE
Filed Nov. 8, 1934

Philip Horinstein
INVENTOR.

Patented Mar. 30, 1937

2,075,613

UNITED STATES PATENT OFFICE 2,075,613

DISPLAY ADVERTISING DEVICE

Philip Horinstein, Chicago, Ill.

Application November 8, 1934, Serial No. 752,101

2 Claims. (Cl. 40—132)

My invention relates to improvements in a display advertising device in which a multiplicity of images of a single object are created for the purpose of attracting attention, this being accomplished by an arrangement of mirrors and reflectors operating in conjunction with a source of light, preferably electric, in a manner which will be described more fully hereinafter.

Figure 1:
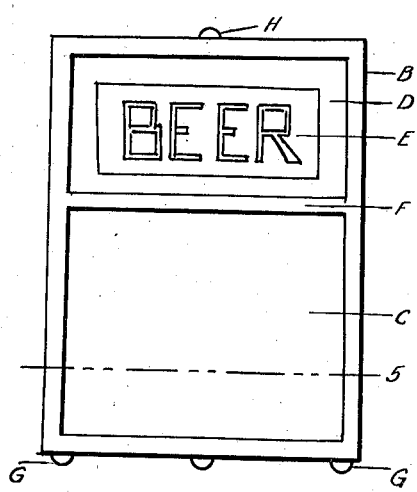
Fig. 1 is a front elevational view of a preferred form of the new advertising display device.
Figure 3:
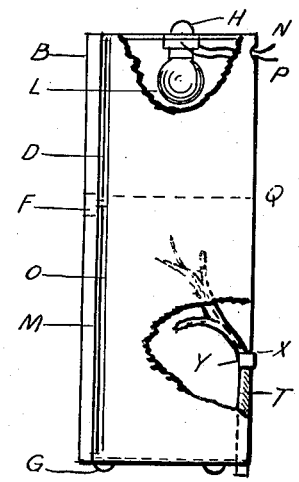
Fig. 3 is a side elevational view of the device shown in Figs. 1 and 2 with a part of one wall of the housing broken away to show the interior of the same.
Figure 2:
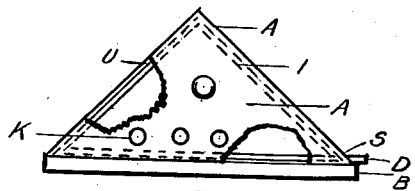
Fig. 2 is a top plan view of the same.
Figure 5:
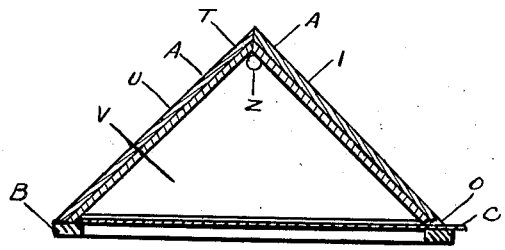
Fig. 5 is a horizontal sectional view of the new device.
Figure 4:
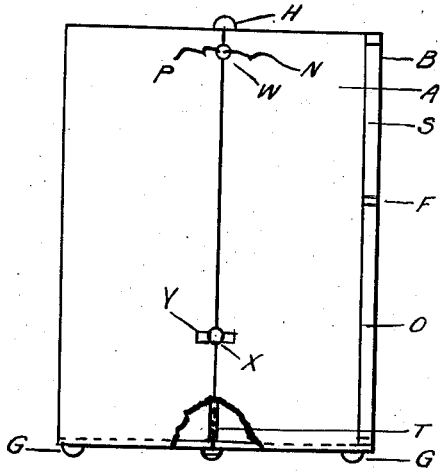
Fig. 4 is a rear elevational view of the device with the mirrors removed.

A preferred embodiment of the new display advertising device is shown in the drawing and comprises a housing B which is provided with supporting lugs G. This cabinet B has a front wall which includes an upper translucent mirror D and a lower translucent mirror C, these mirrors being separated by a strip F. The rear surface of each of these mirrors C and D is coated with a film of silver which is thin enough to permit an observer to see through the same from a darker to a lighter medium and these films are preferably protected by a coating of transparent varnish or cellulose or they may, if desired, be protected by another sheet of glass arranged at the back thereof. Said films are also thick enough so that they will reflect light rays striking them from outside the atmosphere which is normally lighter than the interior of the cabinet when the light source L is not illuminated. The housing includes two side walls A, and a top and a bottom, thus rendering the cabinet or housing normally dark within as viewed from the outside. Formed in one of the side walls A of the housing B are slots or openings S and O through which the mirrors C and D may be slid into and out of the housing B. Formed in the rear wall of the housing B is an opening W through which wires P—N may be extended from the light source L to a wall outlet or the like and this light source L may be used either with or without a conventional flasher (not shown).

Vent holes K are formed in the top of the cabinet B to permit escape of heated air when the device is in operation. An opening X is formed in the cabinet at the junction of the side walls A of the same and a metal clasp Y, is extended through this opening X so as to support an object T which is shown as having the form of a tree. The side walls A of the housing B are lined on the inner surfaces thereof with two plain mirrors I and U. Formed in the bottom wall of the cabinet at the junction of the side walls A is an opening Z and the lower end portion of the object T may be extended through this opening Z so as to hold the same in a fixed position.

The operation of my invention is as follows: When the light L is turned on the object T will be seen through the lower and translucent front mirror C and will be reflected in manifold by the triangular arrangement of mirrors so as to create a plurality of images of the single object T and when the light L is off the interior of the cabinet will be darker than the outside atmosphere so that the translucent front mirrors D and C become, in effect, plain mirrors through which the object T can not be seen.

While I have described my invention as having two front windows, it is obvious that I may use only one and still be within the scope of my invention.

I claim:

1. In a display device, a casing substantially triangular in cross section and including side walls intersecting at the rear of said casing and a light-penetrable front wall having a coating of light-reflective material on the inner side thereof providing a light-reflective mirror, a light-reflective opaque mirror arranged upon and coextensive with the inner surface of each of the other two side walls of said casing, and a source of light in the said casing, said light source being arranged adjacent the top of said casing and in a vertical plane passed through the point of intersection of the said side walls and the vertical center line of the said front wall whereby when the said light source is energized the image of an object disposed in the said casing, below the said light source but in the said plane will be multiplied by the said mirrors and the images thus created will be pyramided one upon the other so as to create the optical illusion in the eye of an observer viewing the casing through the said light-penetrable front wall of the same that a plurality of said objects are in reality disposed therein.

2. In a display device, a casing including opaque side walls and a light penetrable front wall having a coating of light-reflective material on the inner side thereof providing a light-reflective mirror, a plurality of light-reflective mirrors arranged in the said casing upon the said side walls thereof and at an angle relative to each other, and a source of light in the said casing adjacent the top of the latter, whereby when the said light source is energized the image of an object disposed in the said casing below the said light source will be multiplied by the said mirrors and the images thus created will be pyramided one upon the other so as to create the optical illusion in the eye of an observer viewing the casing through the said light penetrable front wall of the same that a plurality of said objects are in reality disposed therein.

PHILIP HORINSTEIN.